United States Patent
Simpson

(10) Patent No.: US 8,879,696 B2
(45) Date of Patent: *Nov. 4, 2014

(54) REMOTE CALL MONITORING

(75) Inventor: Anita Hogans Simpson, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1705 days.

This patent is subject to a terminal disclaimer.

(21) Appl. No.: 11/637,617

(22) Filed: Dec. 12, 2006

(65) Prior Publication Data

US 2007/0165791 A1    Jul. 19, 2007

Related U.S. Application Data

(63) Continuation of application No. 10/346,926, filed on Jan. 17, 2003, now Pat. No. 7,158,619.

(51) Int. Cl.
*H04M 1/64* (2006.01)
*H04M 1/56* (2006.01)
*H04M 3/42* (2006.01)
*H04M 3/436* (2006.01)
*H04M 3/533* (2006.01)
*H04M 3/22* (2006.01)

(52) U.S. Cl.
CPC ............ *H04M 3/2281* (2013.01); *H04M 3/436* (2013.01); *H04M 3/42153* (2013.01); *H04M 2242/22* (2013.01); *H04M 3/533* (2013.01); *H04M 3/42059* (2013.01); *H04M 2203/4563* (2013.01)
USPC ............... 379/88.22; 379/142.01; 379/211.02

(58) Field of Classification Search
USPC ........................................ 379/88.26, 88.12
See application file for complete search history.

(56) References Cited

U.S. PATENT DOCUMENTS

| | | | |
|---|---|---|---|
| 4,811,381 A | | 3/1989 | Woo et al. .................. 379/88.19 |
| 5,243,642 A | | 9/1993 | Wise, Jr. et al. ................ 379/82 |
| 5,333,173 A | | 7/1994 | Seazholtz et al. .............. 379/45 |
| 5,471,519 A | * | 11/1995 | Howe et al. ................ 379/88.26 |
| 5,548,636 A | | 8/1996 | Bannister et al. ........ 379/390.01 |

(Continued)

OTHER PUBLICATIONS

U.S. Office Action dated Dec. 13, 2006 cited in U.S. Appl. No. 10/255,228.

(Continued)

*Primary Examiner* — Joseph T Phan
(74) *Attorney, Agent, or Firm* — Myers Bigel Sibley & Sajovec, P.A.

(57) ABSTRACT

Methods and systems are provided for monitoring calls routed to a telephone network voice mail system from a variety of remote telephone locations. When a subscriber receives a telephone call, a determination is made as to whether the subscriber's line is busy or whether the call goes unanswered. If remote call monitoring services are activated, a three-way communication is set up between the calling party, the voice mail system and the subscriber via a remote call monitoring directory number provided by the subscriber. The subscriber is patched into the call on a listen-only basis, but upon command by the subscriber, the subscriber may answer the call. The subscriber may set up a number of remote call monitoring filters, including an "always monitor" list, a "never monitor" list, and a schedule of days or times during which the subscriber allows or excludes remote call monitoring. Remote call monitoring services may be provided by a telephone services provider that is independent from the subscriber's home telephone services provider.

7 Claims, 12 Drawing Sheets

(56) References Cited

U.S. PATENT DOCUMENTS

| | | | |
|---|---|---|---|
| 5,590,171 A | 12/1996 | Howe et al. | 379/33 |
| 5,604,792 A | 2/1997 | Solomon et al. | 379/88.23 |
| 5,668,862 A | 9/1997 | Bannister et al. | 379/207.14 |
| 5,748,718 A | 5/1998 | Manicone | 379/131 |
| 5,805,587 A | 9/1998 | Norris et al. | 370/352 |
| 5,905,774 A * | 5/1999 | Tatchell et al. | 379/88.04 |
| 5,937,047 A | 8/1999 | Stabler | 379/201 |
| 5,946,386 A * | 8/1999 | Rogers et al. | 379/265.09 |
| 5,956,389 A | 9/1999 | Jung | 379/88.12 |
| 5,960,064 A | 9/1999 | Foladare et al. | |
| 5,999,611 A | 12/1999 | Tatchell et al. | 379/211.02 |
| 6,031,896 A | 2/2000 | Gardell et al. | 379/88.17 |
| 6,101,249 A | 8/2000 | Weber | 379/188 |
| 6,144,644 A | 11/2000 | Bajzath et al. | 370/259 |
| 6,160,877 A * | 12/2000 | Tatchell et al. | 379/197 |
| 6,295,341 B1 * | 9/2001 | Muller | 379/88.18 |
| 6,310,939 B1 | 10/2001 | Varney | 379/88.01 |
| 6,337,898 B1 | 1/2002 | Gordon | 379/67.1 |
| 6,393,122 B1 | 5/2002 | Belzile | 379/358 |
| 6,411,682 B1 | 6/2002 | Fuller et al. | 379/67.1 |
| 6,438,222 B1 | 8/2002 | Burg | 379/215.01 |
| 6,449,474 B1 | 9/2002 | Mukherjee et al. | 455/414 |
| 6,453,164 B1 * | 9/2002 | Fuller et al. | 455/445 |
| 6,477,246 B1 | 11/2002 | Dolan et al. | 379/211.02 |
| 6,493,431 B1 | 12/2002 | Troen-Krasnow et al. | 379/88.12 |
| 6,639,972 B1 | 10/2003 | Cannon et al. | 379/88.18 |
| 6,661,886 B1 | 12/2003 | Huart et al. | 379/215.01 |
| 6,714,637 B1 | 3/2004 | Kredo | 379/215.01 |
| 6,738,461 B2 | 5/2004 | Trandal et al. | 379/142.02 |
| 6,751,300 B2 | 6/2004 | Muller | 379/88.18 |
| 6,754,311 B1 | 6/2004 | Kampmeier et al. | 379/32.01 |
| 6,879,677 B2 | 4/2005 | Trandal et al. | 379/215.01 |
| 6,898,275 B2 | 5/2005 | Dolan et al. | 379/211.02 |
| 6,909,776 B2 | 6/2005 | Holt et al. | 379/88.26 |
| 7,050,559 B2 | 5/2006 | Silver et al. | 379/211.02 |
| 7,106,845 B1 | 9/2006 | Zhuk et al. | |
| 7,158,619 B2 | 1/2007 | Simpson | 379/88.22 |
| 7,245,713 B1 | 7/2007 | Simpson et al. | 379/221.01 |
| 2003/0076941 A1 * | 4/2003 | Tiliks et al. | 379/196 |
| 2003/0108172 A1 | 6/2003 | Petty et al. | 379/142.08 |
| 2003/0118160 A1 * | 6/2003 | Holt et al. | 379/88.12 |
| 2004/0141593 A1 | 7/2004 | Simpson | 379/88.12 |
| 2004/0258220 A1 * | 12/2004 | Levine et al. | 379/88.23 |
| 2007/0041518 A1 | 2/2007 | Silver et al. | 379/67.1 |
| 2008/0069313 A1 | 3/2008 | Simpson et al. | 379/88.12 |

OTHER PUBLICATIONS

U.S. Appl. No. 11/879,478 entitled "Call Monitoring" filed Jul. 17, 2007.
U.S. Office Action dated Dec. 19, 2003 cited in U.S. Appl. No. 10/026,394.
U.S. Office Action dated Jun. 7, 2004 cited in U.S. Appl. No. 10/026,394.
U.S. Office Action dated Dec. 29, 2004 cited in U.S. Appl. No. 10/026,394.
U.S. Final Office Action dated Aug. 9, 2005 cited in U.S. Appl. No. 10/026,394.
U.S. Office Action dated Sep. 17, 2003 cited in U.S. Appl. No. 10/255,228.
U.S. Final Office Action dated Mar. 22, 2004 cited in U.S. Appl. No. 10/255,228.
U.S. Office Action dated Sep. 22, 2004 cited in U.S. Appl. No. 10/255,228.
U.S. Final Office Action dated Jun. 16, 2005 cited in U.S. Appl. No. 10/255,228.
U.S. Office Action dated Dec. 5, 2005 cited in U.S. Appl. No. 10/255,228.
U.S. Final Office Action dated Jun. 28, 2006 cited in U.S. Appl. No. 10/255,228.
U.S. Office Action dated Sep. 23, 2004 cited in U.S. Appl. No. 10/346,926.
U.S. Office Action dated Jun. 16, 2005 cited in U.S. Appl. No. 10/346,926.
U.S. Office Action dated Jan. 3, 2006 cited in U.S. Appl. No. 10/346,926.
U.S. Final Office Action dated Aug. 9, 2006 cited in U.S. Appl. No. 10/346,926.

* cited by examiner

REMOTE CALL MONITORING

RELATED APPLICATIONS

This application is a Continuation Application of U.S. application Ser. No. 10/346,926 entitled "Remote Call Monitoring" filed Jan. 17, 2003 now U.S. Pat. No. 7,158,619, which is related to U.S. application Ser. No. 10/026,394 entitled "Apparatus, System and Method for Monitoring a Call Forwarded to a Network-Based Voice Mail System" filed Dec. 21, 2001, now U.S. Pat. No. 7,050,559 issued on May 23, 2006, U.S. application Ser. No. 11/439,371 entitled "Apparatus, System and Method for Monitoring a Call Forwarded to a Network-Based Voice Mail System" filed May 23, 2006, and U.S. application Ser. No. 10/255,228 entitled "Call Monitoring" filed Sep. 26, 2002, which are incorporated herein by reference.

FIELD OF THE INVENTION

This invention relates generally to methods and systems for monitoring calls routed to a voice mail system from a variety of remote telephone locations.

BACKGROUND OF THE INVENTION

A common use for telephone answering machines is call screening or call monitoring. In a typical setting, the user of a telephone answering machine may set the answering machine so that the user may listen to incoming messages as they are being recorded on the answering machine. If the user recognizes the voice of the caller and would like to speak with the caller, the user may answer the call. On the other hand, if the user does not recognize the caller, or if the user otherwise does not want to take the call, the user simply may allow the caller to finish recording the message. This call screening or call monitoring ability is particularly useful to avoid unwanted telephone solicitations.

Many modern telephone systems include network-based voice mail systems to which incoming calls are routed when the voice mail system user's telephone is busy or is not answered. In such systems incoming callers are routed directly to the voice mail system if the user's telephone is busy or is unanswered. That is, the call is not routed through the user's telephone where he or she may listen to the voice mail message being recorded by the caller in order to screen or monitor the call. The user must simply wait until the message has been recorded by the caller and then call into the voice mail system to retrieve the message. Moreover, if the user is away from the user's telephone at a remote location, the user has no way of knowing that a message has been left for the user other than to call into the voice mail system from time to time to check for voice mail messages.

It is with respect to these and other considerations that the present invention has been made.

SUMMARY OF THE INVENTION

In accordance with the present invention, the above and other problems are solved by methods and systems for monitoring calls routed to a telephone network voice mail system from a variety of remote telephone locations. A subscriber to voice mail services contacts her telephone services provider to request remote call monitoring services. Once the subscriber is validated as an authorized subscriber, the subscriber may activate remote call monitoring services and set a variety of remote call monitoring filters. The subscriber provides the telephone directory number of the wire line or wireless telephone with which she would like to monitor incoming voice mail messages. Thus, the subscriber may monitor calls to the voice mail system remotely from any telephone for which she provides the telephone directory number.

The subscriber may select a remote call monitoring filter to monitor all voice mail calls. The subscriber may select a filter to monitor only calls associated with a list of telephone directory numbers provided by the subscriber. The subscriber may select a filter to monitor all calls except calls associated with a list of telephone directory numbers provided by the subscriber. Or, the subscriber may set up a remote call monitoring schedule whereby the subscriber only monitors calls directed to the voice mail system during a prescribed period of time set.

After remote call monitoring setup is complete, the subscriber may monitor or screen incoming voice mail messages from the telephone associated with the remote call monitoring directory number provided by the subscriber. When the subscriber receives a telephone call, a determination is made as to whether the subscriber's line is busy or whether the call goes unanswered. In either case, a network element such as a service control point determines whether the remote call monitoring service is activated for the subscriber's line. If so, a determination is made as to whether the caller identification for the incoming call is included on a list of telephone directory numbers requiring that the incoming call should always be monitored, or conversely, requiring that the call should not be monitored. If the incoming call is a call that should be monitored according to the remote call monitoring filters selected by the subscriber, a determination is made as to whether the call is being received during a time period in which the subscriber has provided for remote call monitoring, or during a time period in which the subscriber has excluded remote call monitoring.

If remote call monitoring is appropriate for the incoming caller and for the time period in which the incoming call is received, the network element retrieves the remote call monitoring telephone directory number provided by the subscriber. The network element then routes the call to a separate network element such as a services node and includes with the routed call the originally dialed telephone directory number, the voice mail system access number, and the remote call monitoring telephone directory number. The network element, such as the services node, then establishes a three-way conference call between the incoming caller, the voice mail system and the subscriber in a listen-only mode. In order to set up the three-way conference call, the network element, such as the services node, places a call to the subscriber at the remote call monitoring telephone directory number so that the subscriber may answer and listen to the voice mail message being recorded by the incoming caller. If desired, a distinctive ring may be provided to the subscriber to allow the subscriber to readily ascertain that the call is associated with the remote call monitoring service. Additionally, the telephone directory number of the network element and a caller name identification such as "remote call monitoring service" may be provided in the caller identification screen of the subscriber's telephone.

While the subscriber is listening to the incoming voice mail message, the subscriber may selectively interrupt the voice mail recording session and accept the call from the incoming caller. If the subscriber chooses to accept the incoming call, the network element, such as the services node, routes the incoming call to the subscriber at the remote call monitoring telephone directory number provided by the subscriber.

According to another aspect of the present invention, remote call monitoring may be provided to a subscriber whose telephone services provider is independent of the telephone services provider that provides the remote call monitoring services. The independent call monitoring subscriber contacts her telephone services provider (home services provider) to request that remote call monitoring services be provided by a separate telephone services provider. The subscriber provides the telephone directory number of the wireline or wireless telephone with which she would like to monitor incoming voice mail messages. The subscriber provides her home services provider with directory numbers that will forward calls received by the subscriber to the separate telephone services provider (independent call monitoring services provider) for provision of call monitoring services when the subscriber's wireline or wireless telephone is busy or is not answered. In response, the subscriber's telephone service provider provisions a trigger on the subscriber's wireline or wireless switch to invoke independent remote call monitoring services of the separate telephone service provider when a call is placed to the subscriber when the subscriber's line is busy or not answered. In addition, the subscriber may select from the remote call monitoring filters, described above.

When the independent remote call monitoring subscriber receives a telephone call at her wireline or wireless switch when the subscriber's line is busy or not answered, a call is placed from the home services provider to the independent call monitoring services provider for receiving the independent remote call monitoring services of the independent call monitoring services provider. At the independent call monitoring services provider, a database lookup is performed to validate the subscriber's access to the independent remote call monitoring services and to obtain an access number for the subscriber's voice mail system at her home services provider. The subscriber's originally dialed telephone directory number and the subscriber's home voice mail system access number are routed to a network element, such as a services node, of the independent call monitoring services provider.

A network element, such as the services node, then establishes a three way conference call between the incoming caller, the subscriber's home voice mail system, and the subscriber in a listen-only mode. In order to set up the three way conference call, the network element, such as the services node, places a call to the subscriber at the subscriber's remote call monitoring telephone directory number so that the subscriber may answer and listen to the voice mail message being recorded by the incoming caller. If desired, a distinctive ring may be provided to the subscriber to allow the subscriber to readily ascertain that the call is associated with the independent remote call monitoring service. Additionally, the telephone directory number of the network element and a caller name identification such as "independent remote call monitoring service" may be provided in the caller identification screen of the subscriber's telephone.

While the subscriber is listening to the incoming voice mail message, the subscribed may selectively interrupt the voice mail recording session and accept the call from the incoming caller. If the subscriber chooses to accept the incoming caller, the network element, such as the services node, routes the incoming call to the subscriber at the independent remote call monitoring telephone directory number provided by the subscriber.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

The following description of embodiments of the present invention is made with reference to the above-described drawings wherein like numerals refer to like parts or components throughout the several figures. The present invention is directed to methods and systems for monitoring calls routed to a voice mail system from a variety of remote telephone locations.

Operating Environment

Figure 1:
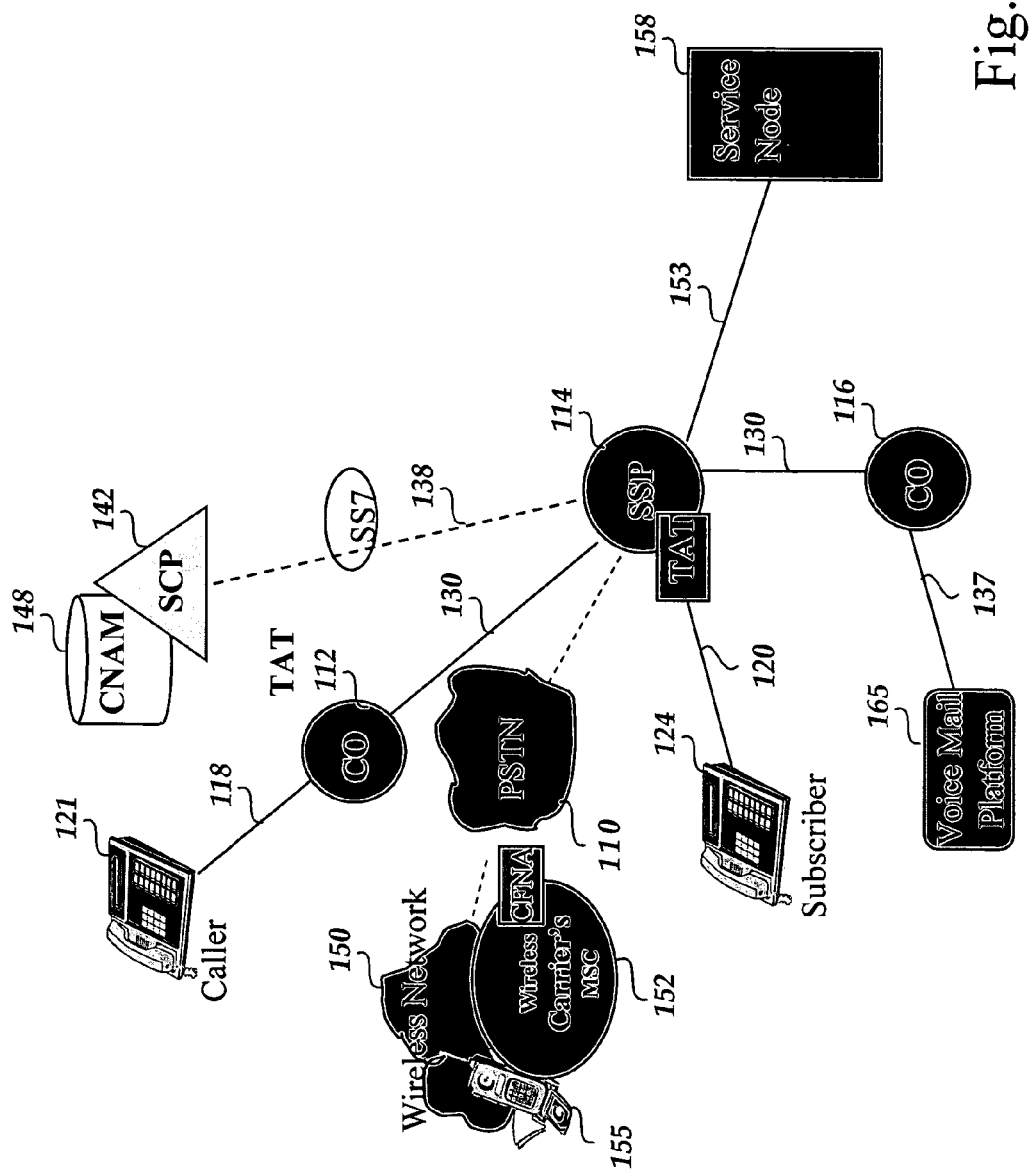
FIG. 1 is a simplified block diagram illustrating components of a wire line and wireless communications network that provides an operating environment for the present invention.

FIG. 1 is a block diagram illustrating components of a wireline and wireless telephone network that provides an exemplary operating environment for the present invention. The public switched telephone network 110 that evolved in the 1980s incorporated the advanced intelligent network (AIN). Some of the components of the advanced intelligent network are illustrated in FIG. 1. FIG. 1 is illustrative of at least a part of the advanced intelligent network (AIN) of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network 110. As shown in FIG. 1, each central office may include an electronic switch known to those skilled in the art as a service switching point (SSP). These are indicated in FIG. 1 as SSP switches 112, 114 and 116. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 130.

As shown in FIG. 1, switches (SSP) 112, 114, and 116 have a plurality of subscriber lines 118 and 120 connected thereto. Each of the subscriber lines 118 and 120 is connected to a terminating piece or pieces of customer premises equipment that are represented by telephones 121 and 124. SSP switches 112 and 114 are connected by a plurality of trunk circuits 130. These are the voice path trunks that interconnect the central offices 112 and 114 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 118 shown in FIG. 1.

Much of the intelligence, and the basis for many of the enhanced features of the network, resides in the local service control point (SCP) 142. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 142, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

The modern Advanced Intelligent Network also includes services nodes (SN) such as the services node 158. Those skilled in the art are familiar with services nodes, which are physically implemented by the same types of computers that embody the SCP 142. In addition to the computing capability and data base maintenance features, services nodes 158 use ISDN lines and may include DTMF signal recognition devices, tone generation devices, text to speech (TTS) voice synthesis devices and other voice or data resources. As shown in FIG. 1, the connection is through the SSP. For example, SN 158 is connected to SCP 142 via ISDN links 153 to SSP 112, ISDN/SS7 protocol conversion in SSP 112, and SS7 links 138. According to a preferred embodiment, the ISDN links 153 serve as a primary rate interface (PRI) over which services may be provided to subscribers using wireline services such as the wireline telephone sets 121 and 124 and subscribers using wireless services such as the wireless units.

The voice mail system 165 is shown in FIG. 1 being functionally connected to the switch 116 and is a component of the network. That is, calls are routed to and from the voice mail system 165 at the control and direction of the network via such components as the SCP 142. The voice mail system 165 may be connected to the switch 116 via a PRI interface line 137 similar to the connection of the services node 158 to the switch 114. In operation, the voice mail system 165 is treated like a switch 114 whereby calls directed to voice mail boxes maintained at the voice mail system 165 are directed to the voice mail system 165 as calls are directed to customer premises equipment, such as telephones, via switches 112, 114.

The voice mail system 165 typically includes a computer or collection of computers, recording and recording playback devices, and software for recording announcements for incoming calls, recording and playing back recorded messages, and for receiving incoming calls and for making outgoing calls at the direction of the network. In addition to the recording and playback functionality, the voice mail system 165 includes text-to-speech (TTS) and speech-to-text (STT) synthesis devices and software for conversion of analog voice messages to digitized forms such as WAV files and MP3 files. The voice mail system 165 has memory capacity for saving announcements to incoming callers and for saving messages from incoming callers.

The wireless network 150, such as a cellular network, comprises a mobile switching center (MSC) 152. The MSC is a switch providing services and coordination between wireless users in the network 150 and external networks. The MSC also communicates with a wireless subscriber, such as wireless telephone. The wireless telephone 155 is also illustrative of other wireless computing devices, such as pagers and personal digital assistants.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 112 and 114, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 112 to take a certain action. If the SSP 112 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Operation

Having described an operating environment for the present invention with reference to FIG. 1, the following is a description of the logical flow of steps performed by methods and systems of the present invention for activating and deactivating a remote call monitoring service according to the present invention. Also described are the logical flows of steps performed by methods and systems of the present invention for monitoring calls routed to a network-based voice mail system according to a variety of remote call monitoring service filter settings.

Figure 2:
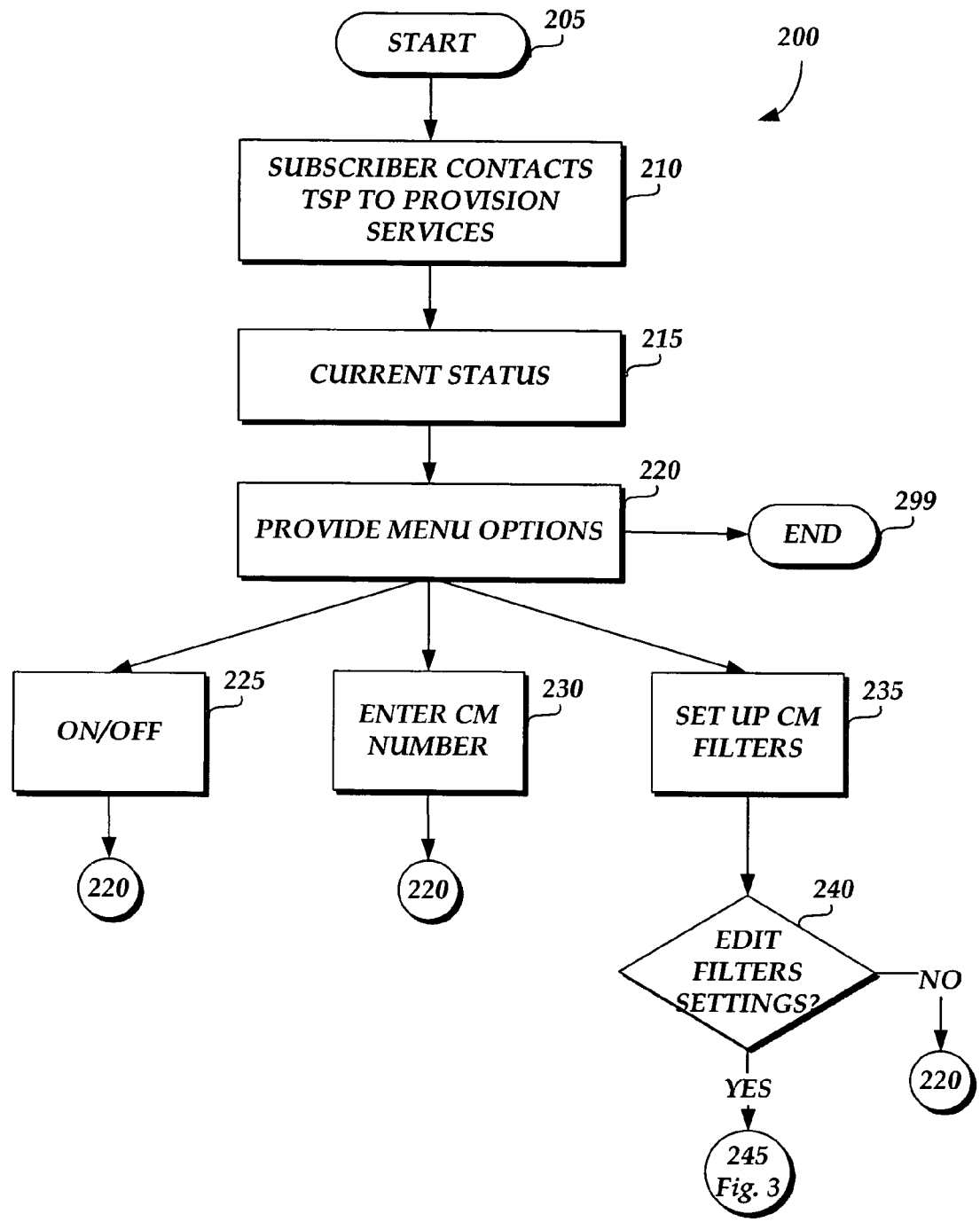
FIGS. 2 and 3 illustrate a logical flow of the steps performed by a method system of the present invention for activating and/or deactivating a remote call monitoring service according to the embodiment of the invention.
Figure 3:
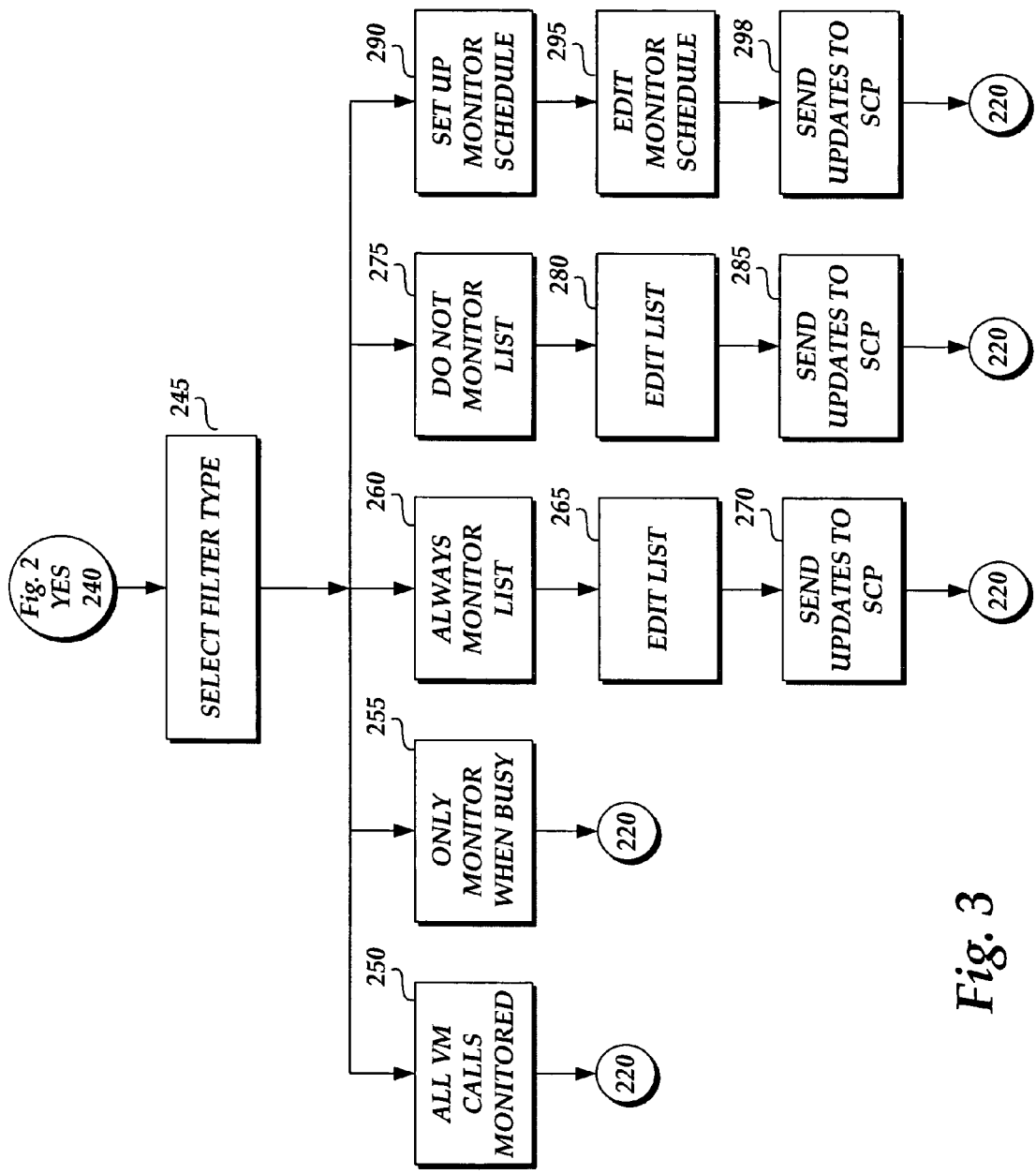

FIGS. 2 and 3 illustrate a logical flow of the steps performed by a method system of the present invention for activating and/or deactivating a remote call monitoring service according to the embodiment of the invention. The method 200 begins at start step 205 and proceeds to step 210 where a subscriber contacts her telephone services provider to provision remote call monitoring services on her telephone line 120. According to one embodiment of the present invention the subscriber may contact the telephone services provider via her telephone 124 using a feature code such as "*12" for allowing the subscriber access to the remote call monitoring services for activating the remote call monitoring service on her telephone line. According to an alternative embodiment, the subscriber may contact the telephone services provider via an Internet-based website operated by the telephone services provider for allowing subscribers to access services such as the remote call monitoring services of the present invention via a personal computer (not shown).

At step 210, the subscriber is validated as being authorized to activate or deactivate the remote call monitoring service by requiring a validation identification such as a pass code from the subscriber. At step 215, the subscriber's switch 114 queries the service control point 142 for the current status of the remote call monitoring service. In response, an announcement may be played to the subscriber such as "remote call monitoring is on, or remote call monitoring is off." Likewise, the status of remote call monitoring service filters may be provided to the subscriber by playing an announcement such as "remote call monitoring is activated for all calls." Additionally, an announcement may be played to identify the current remote call monitoring telephone directory number such as "voice mail is being monitored on telephone directory number 404-555-1234."

At step 220, a menu of options is provided to the subscriber to allow the subscriber to edit the current operating status of the remote call monitoring service on her telephone line. At step 225, the subscriber may turn the remote call monitoring service on or off in response to a message such as "to activate the remote call monitoring service, press 1." At step 230, the subscriber is prompted to enter a remote call monitoring telephone directory number. The remote call monitoring telephone directory number is the telephone directory number of the telephone from which the subscriber will monitor calls directed to the voice mail system 165. That is, the remote call monitoring number may be the telephone directory number of the subscriber's telephone 124, the subscriber's wireless telephone 155, or any other telephone operated by the subscriber at any remote location.

At step 235, the subscriber is prompted to set up remote call monitoring filters. At step 240, a determination is made at to whether the subscriber desires to edit the current remote call monitoring filter settings. If not, the method proceeds back to step 220, and the subscriber may choose from other options, as described above. If the subscriber does desire to set remote call monitoring filters, the method proceeds to step 245, illustrated in FIG. 3. At step 245, the subscriber chooses the filter type she wishes to select or deselect.

If the subscriber desires that all calls directed to the voice mail system 165 be monitored by the subscriber at the remote call monitoring number, the method proceeds to step 250 and calls directed to the voice mail system 165 are selected for monitoring whether the subscriber's line 120 is busy, unanswered, and regardless of the identity of the calling party. At step 255, the subscriber may select a remote call monitoring filter that will cause only calls directed to the voice mail system 165 upon a busy status of the subscriber's line 120 to be directed to the subscriber via the remote call monitoring telephone directory number.

At step 260, the subscriber may create a list of calling parties by calling party telephone directory number that should always be monitored. At step 265, the subscriber may edit the list of caller identification numbers by adding or deleting caller identification numbers to or from the list. At step 270, the updated list of caller identification numbers on the "always monitored" list is forwarded to the service control point 142 for subsequent use. The "always monitor" list may be a list of telephone directory numbers associated with incoming callers for whom the subscriber would always like the opportunity to monitor voice mail messages. For example, the subscriber may wish to add the telephone directory number of a close relative or business associate so that incoming calls directed to the voice mail system 165 from that caller will always be directed to the remote call monitoring number provided by the subscriber.

At step 275, the subscriber may select and edit a list of caller identification numbers associated with incoming callers that should never be monitored. At step 280, the subscriber may edit the list by adding or deleting caller identification numbers to or from the list. At step 285, the updated list of caller identification numbers from the "never monitor" list is forwarded to the service control point 142 for future use. The "never monitor" list may include telephone directory numbers of incoming callers from whom the subscriber may never wish to have voice mail messages directed to the remote call monitoring number. For example, the subscriber may designate on the "never monitor" list all calls identified as "out of area" which are known to be associated with unwanted telephone solicitation calls. Accordingly, such calls will never be directed to the remote call monitoring number provided by the subscriber unless and until the subscriber changes the "never monitor" list filter setting or until the subscriber edits the "never monitor" list to allow previously excluded calls to be directed to the remote call monitoring number.

At step 290, the subscriber may set up a remote call monitoring schedule including time periods in which the subscriber would like to monitor calls directed to the voice mail system 165. For example, the subscriber may enter a start time of 8:00 a.m. and a stop time of 11:00 a.m. because the subscriber knows that between 8:00 a.m. and 11:00 a.m. the subscriber will be away from her office and she would like to monitor calls directed to the voice mail system 165 via her wireless telephone 155. Likewise, the subscriber may enter a start day of Monday and a stop day of Wednesday if the subscriber would like to monitor calls directed to the voice mail system 165 during the three-day period between Monday and Wednesday. At step 295, the subscriber edits the current monitoring schedule including keeping the current monitoring schedule, changing the current monitoring schedule, or deleting the current monitoring schedule altogether. At step 298, the updated remote call monitoring schedule is forwarded to the service control point 142 for future use.

Figure 4:
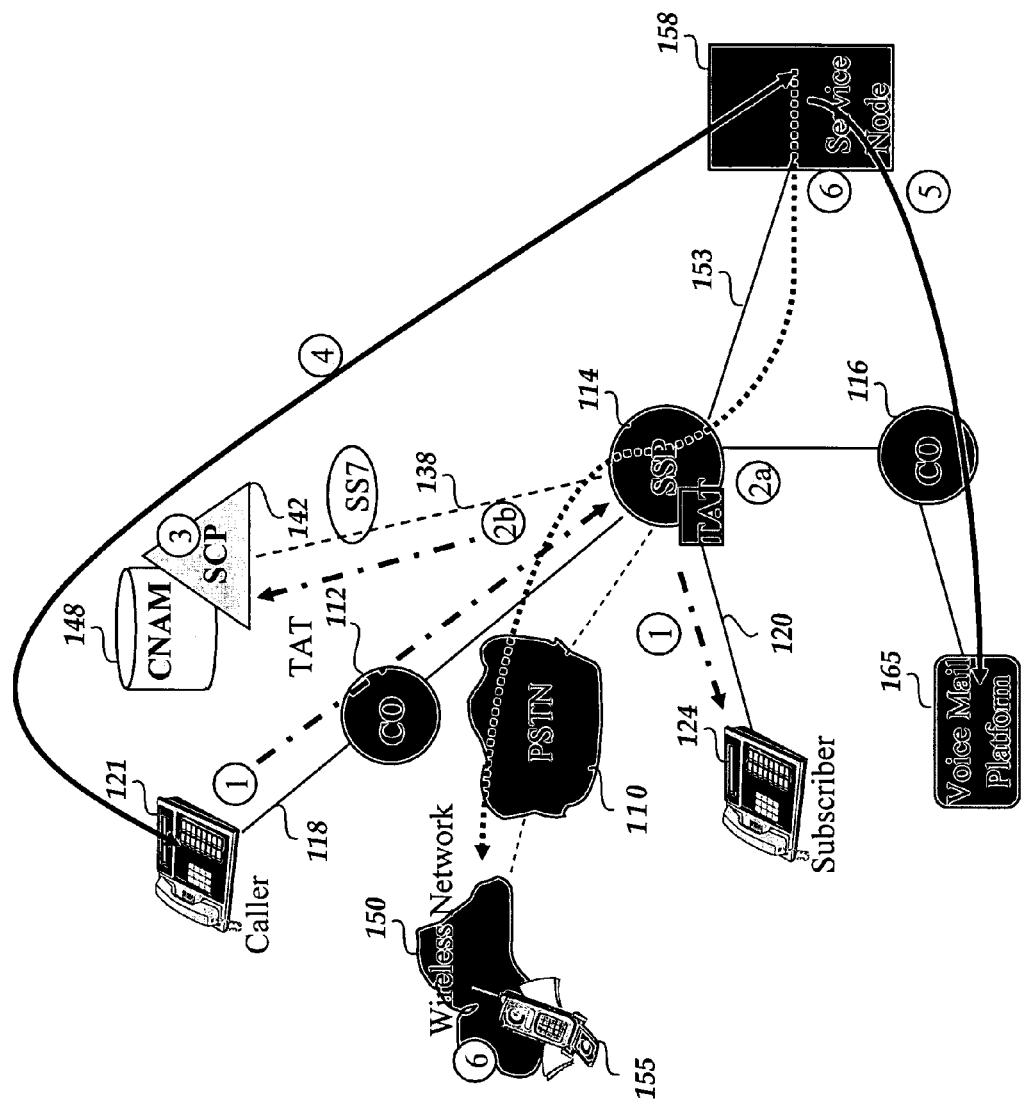
FIG. 4 illustrates a logical call flow of the steps performed by a method system of the present invention for remotely monitoring calls routed to a network-based voice mail system.

FIG. 4 illustrates a logical call flow of the steps performed by a method and system of the present invention for remotely monitoring calls routed to a network-based voice mail system. At step 1, a caller utilizing her telephone 121 dials the telephone directory number of the subscriber at the subscriber's telephone 124. At step 2*a*, a determination is made at the subscriber's switch 114 as to whether the call is answered. If the call is answered, the method ends. If the call is not answered a determination is made as to whether a Call Forwarding No Answer feature is activated or whether a Call Forwarding on Busy feature is activated. It should be understood by those skilled in the art, if a Call Forwarding No Answer feature is activated, then calls directed to the subscriber's telephone directory number are forwarded to the voice mail system 165 if the call to the subscriber is not answered. If the Call Forwarding on Busy feature is activated then calls directed to the subscriber's telephone directory number are forwarded to the voice mail system 165 if the subscriber's line 120 is busy.

If the call to the subscriber is forwarded because the line is not answered or because the line is busy, as described, at step 2*b*, a public office dialing plan (PODP) trigger is fired at the subscriber switch 114 causing a query to be launched to the service control point 142. At step 3, SCP 142 checks the remote call monitoring service status on the subscriber's line 120. If the remote call monitoring status is set to ON, the SCP checks for a remote call monitoring directory number and for remote call monitoring service filter settings provided by the subscriber. If the remote call monitoring status is set to OFF, the method proceeds in accordance with the steps described with reference to FIG. 5 or 6, described below.

If the remote call monitoring status is set to ON, the service control point retrieves the remote call monitoring directory number, the voice mail system 165 access number and remote call monitoring service filter settings provided by the subscriber. The remote call monitoring directory number may be a directory number associated with any telephone from which the subscriber would like to monitor calls directed to the voice mail system 165, including the subscriber's local telephone 124. At step 4, the SCP 142 routes to the services node 158 the calling party directory number, the subscriber directory number, the remote call monitoring directory number and the voice mail system 165 access number.

At step 5, the services node 158 sets up a call between the caller from the caller's telephone 121 and the voice mail system 165 through the central office switch 116. At step 6, the services node 158 bridges the subscriber into the call between the calling party and the voice mail system 165 via the subscriber's wireless telephone 155. As should be understood, the subscriber may be connected via another telephone including another wireless telephone or another wire line telephone. The illustration of the wireless telephone 155 is for purposes of example only. In order to bridge the subscriber into the call between the calling party and the voice mail system 165, the services node 158 calls the remote call monitoring directory number of the subscriber's wireless telephone 155 as previously provided by the subscriber. The service control point obtains from the CNAM database 148 a caller identification name of "remote call monitoring" and passes that caller identification information to the subscriber at the wireless telephone 155 so that the subscriber will recognize that the call from the services node 158 is from the remote call monitoring service.

When the subscriber answers a call from the services node 158 at the subscriber's wireless telephone 155, the subscriber is bridged into the call between the caller and the voice mail system 165 so that the subscriber may listen to the message being recorded by the caller in order to screen or monitor the call. According to a preferred embodiment, once the subscriber answers the call from the services node 158 an announcement is placed to subscriber such as "remote call monitoring, to talk to the caller press 1." Monitoring of the incoming voice mail message may be set for a duration equal to the amount of time available to the caller for leaving a voice mail message to the subscriber. That is, if the caller may leave a message up to a length of 120 seconds, then the subscriber may listen to the recording of the voice mail message for up to 120 seconds.

If the subscriber presses 1, for example, in response to the prompt from the services node 158, the services node 158 routes the call to the switch 114 through the public switch telephone network 110 through the wireless network 150 and to the subscriber at the wireless telephone 155. Once the services node routes the call to the subscriber, the connection between the caller, the services node 158, and the voice mail system 165 is terminated, and the caller is left in communication with the subscriber at the subscriber's wireless telephone 155 according to well-known call processing methods.

According to an alternative embodiment, the subscriber may subscribe to a distinctive ringing service whereby the subscriber may store and select the remote call monitoring directory number for presentation with a distinctive ring anytime that number is dialed. As is known to those skilled in the art, distinctive ringing services allow a subscriber to select certain numbers for presentation with distinctive rings. For example, if the subscriber selects a close friend's telephone directory number as a distinctive ringing number, when the subscriber receives a telephone call from that telephone directory number, the subscriber is presented with a distinctive ring that alerts the subscriber to the identity of that caller. According to an embodiment of the present invention, the caller may select the remote call monitoring service directory number associated with the services node 158 for treatment with a distinctive ring. Accordingly, when the subscriber receives a remote call monitoring service call from the services node 158, as described above, the subscriber will receive a distinctive ring to alert the subscriber that the incoming call is a remote call monitoring service call.

Figure 5:
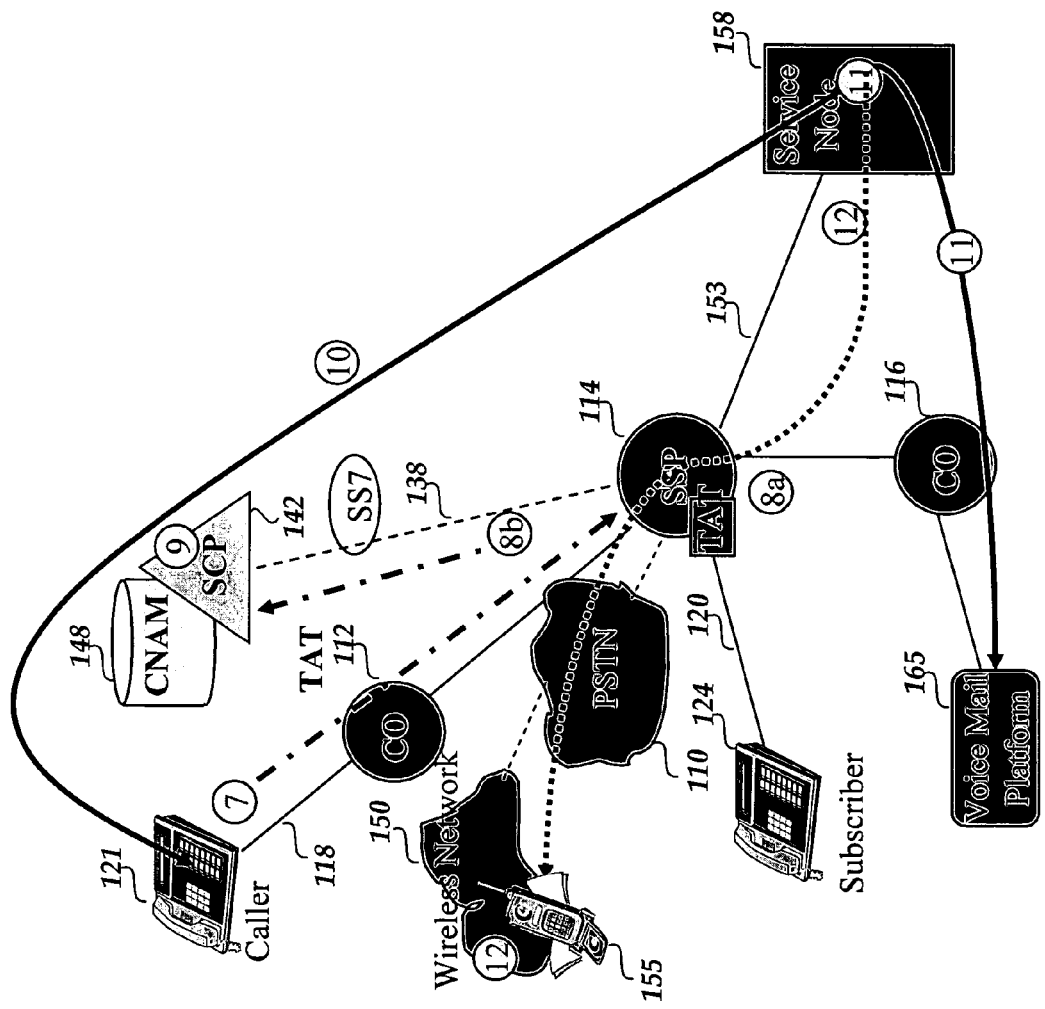
FIG. 5 illustrates a logical call flow of the steps performed by a method system of the present invention for monitoring calls directed to a network-based voice mail system where the calling party is on a list of calling parties to be monitored.

FIG. 5 illustrates a logical call flow of the steps performed by a method system of the present invention for monitoring calls directed to a network-based voice mail system where the calling party is on a list of calling parties always to be monitored. At step 7, a caller utilizing her telephone 121 dials the telephone directory number of the subscriber at the subscriber's telephone 124. At step 8a, a determination is made at the subscriber's switch 114 as to whether the call is answered. If the call is answered, the method ends. If the call is not answered a determination is made as to whether a Call Forwarding No Answer feature is activated or whether a Call Forwarding on Busy feature is activated. If the call to the subscriber is forwarded because the line is not answered or because the line is busy, at step 8b, a PODP trigger is fired at the subscriber switch 114 causing a query to be launched to the service control point 142. At step 9, the SCP 142 checks the remote call monitoring service status for the subscriber's line 120. The SCP 142 also checks for the remote call monitoring directory number provided by the subscriber and for any filtering settings provided by the subscriber.

According to the example illustrated in FIG. 5, the SCP 142 determines that the remote call monitoring service status is set to OFF. The SCP 142 next determines whether the calling party is on the "always monitor" list created by the subscriber by determining whether a calling party identification for the calling party is on the "always monitor" list. According to an embodiment of the invention, the "always monitor" list may include a list calling party identifications associated with calling parties whereby calls from any of the calling party identifications included on the "always monitor" list always invoke remote call monitoring services. The calling party identifications may include calling party directory numbers, caller ID presentation indicator status of "private," caller ID presentation indicator status of "unknown" and/or a caller ID presentation indicator status of "out-of-area" as designated by the subscriber for inclusion on the "always monitor" list. According to this call flow, although the remote call monitoring status is set to OFF, the SCP 142 routes the call to the services node 158 for remote call monitoring treatment because the telephone directory number associated with the incoming caller is on the "always monitor" list as prescribed by the subscriber.

At step 10, the SCP 142 routes to the services node 158 the calling party directory number, the subscriber directory number, the remote call monitoring directory number and the voice mail system 165 access number. At step 11, the services node 158 sets up a call between the caller and the voice mail system 165 through the central office switch 116. At step 12, the services node 158 bridges the subscriber into the call between the calling party and the voice mail system 165 via the subscriber's wireless telephone 155.

Figure 6:
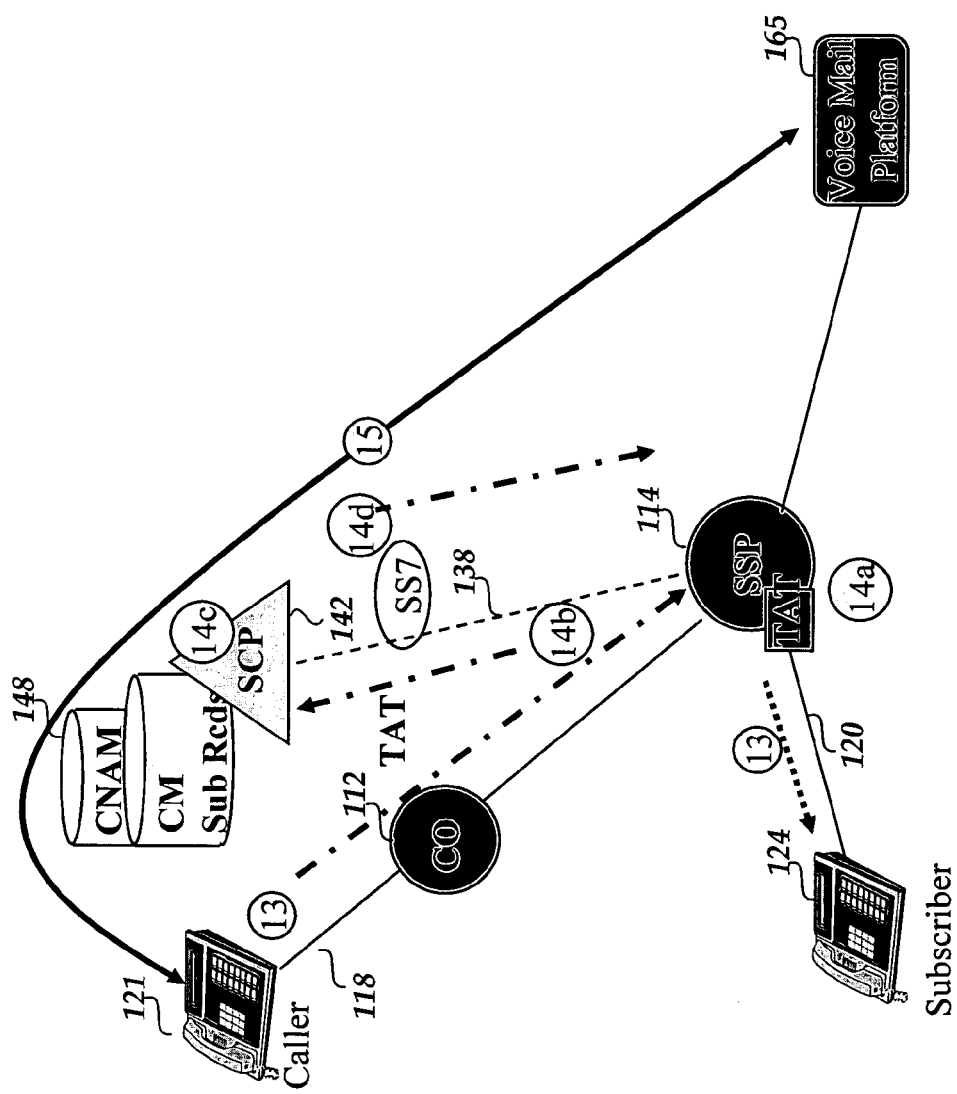
FIG. 6 illustrates a logical call flow of the steps performed by a method system of the present invention for monitoring a call directed to a network-based voice mail system where the calling party is not on a list of calling parties to be monitored by a subscriber.

FIG. 6 illustrates a logical call flow of the steps performed by a method system of the present invention for monitoring a call directed to a network-based voice mail system where the calling party is not on a list of calling parties to be monitored by a subscriber. At step 13, a caller utilizing her telephone 121 dials the telephone directory number of the subscriber at the subscriber's telephone 124. At step 14a, a determination is made at the subscriber's switch 114 as to whether the call is answered. If the call is answered, the method ends. If the call is not answered a determination is made as to whether a Call Forwarding No Answer feature is activated or whether a Call Forwarding On Busy feature is activated. If the call to the subscriber is forwarded because the line is not answered or because the line is busy, at step 14b, a PODP trigger is fired at the subscriber switch 114 causing a query to be launched to the service control point 142.

At step 14c, the service control point 142 checks the remote call monitoring status, the remote call monitoring directory number and filter settings provided by the subscriber. According to the call flow illustrated in FIG. 6, the service control point 142 determines that the remote call monitoring service is set to OFF by the subscriber. In response, the service control point determines whether the directory number associated with the incoming caller is on an "always monitor" list provided by the subscriber. According to the call flow illustrated FIG. 6, the service control point determines that the directory number associated with the incoming caller is not on the "always monitor" list. Because the caller is not on the "always monitor" list and because the remote call monitoring status is set to OFF by the subscriber, at step 14d, the service control point 142 sends an Authorize Termination Response message to the SSP 114 instructing the SSP to route the call directly to the voice mail system 165 so that the calling party may leave a message for the subscriber. At step 15, the SSP 114 routes the caller directly to the voice mail system 165.

Figure 7:
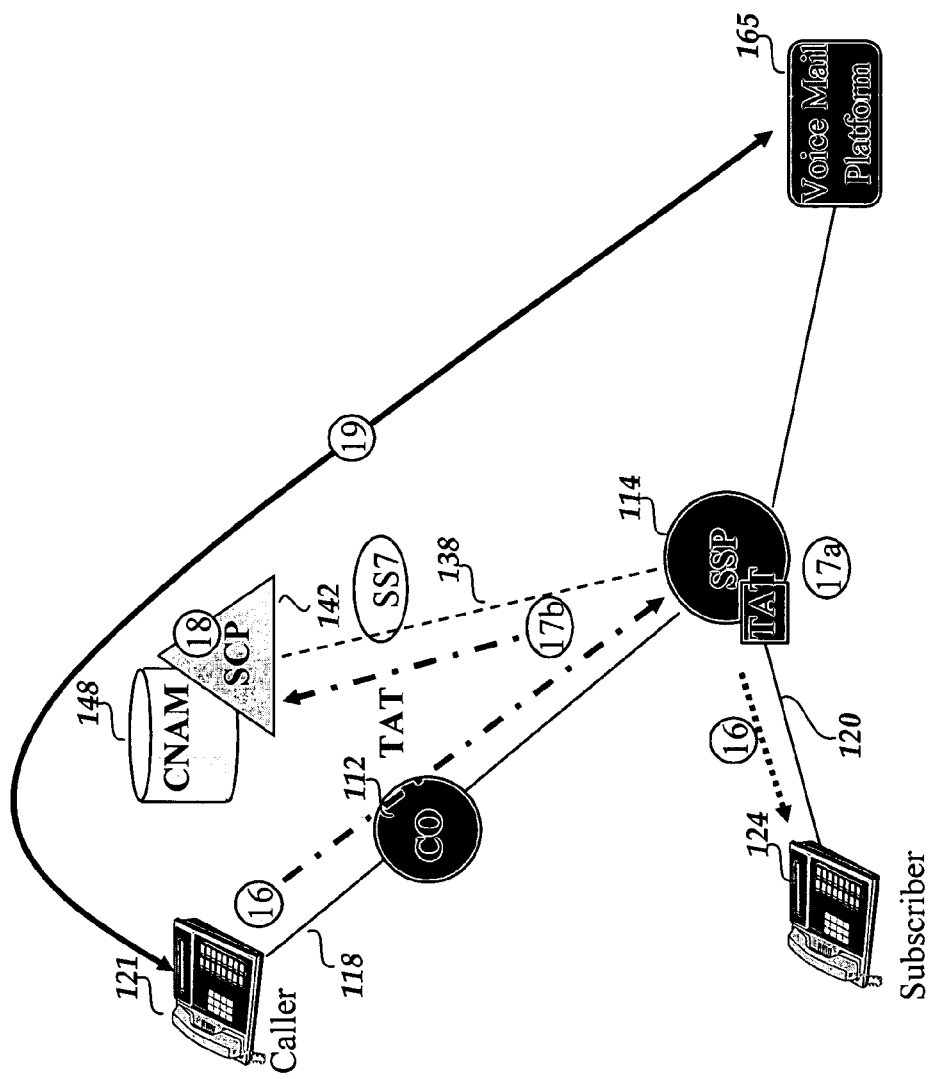
FIG. 7 illustrates a logical call flow of the steps performed by a method system of the present invention for monitoring a call directed to a network-based voice mail system where the calling party is on a list of calling parties that should not be monitored by the subscriber.

FIG. 7 illustrates a logical call flow of the steps performed by a method system of the present invention for monitoring a call directed to a network-based voice mail system where the calling party is on a list of calling parties that should not be monitored by the subscriber. At step 16, a caller utilizing her telephone 121 dials the telephone directory number of the subscriber at the subscriber's telephone 124. At step 17a, a determination is made at the subscriber's switch 114 as to whether the call is answered. If the call is answered, the method ends. If the call is not answered a determination is made as to whether a Call Forwarding No Answer feature is activated or whether a Call Forwarding On Busy feature is activated. If the call to the subscriber is forwarded because the line is not answered or because the line is busy, at step 17b, a PODP trigger is fired at the subscriber switch 114 causing a query to be launched to the service control point 142.

At step 18, the service control point 142 checks the remote call monitoring service status, the remote call monitoring directory number, and any remote call monitoring filter settings provided by the subscriber. According to the call flow illustrated in FIG. 7, the service control point determines that the remote call monitoring status is set to ON. Next, the service control point 142 checks whether the calling party identification associated with the caller is on a "never monitor" list provided by the subscriber. The "never monitor" list may include a list calling party identifications associated with calling parties whereby calls from any of the calling party identifications included on the "never monitor" list never invoke remote call monitoring services. The calling party identifications may include calling party directory numbers, caller ID presentation indicator status of "private," caller ID presentation indicator status of "unknown" and/or caller ID presentation indicator status of "out-of-area" as designated by the subscriber for inclusion on the "never monitor" list. If at step 18 the service control point 142 determines that the caller identification is on a "never monitor" list, the method moves to step 19, and the service control point 142 routes the caller directly to the voice mail system 165 where the caller may leave a voice mail message for the subscriber.

Figure 8:
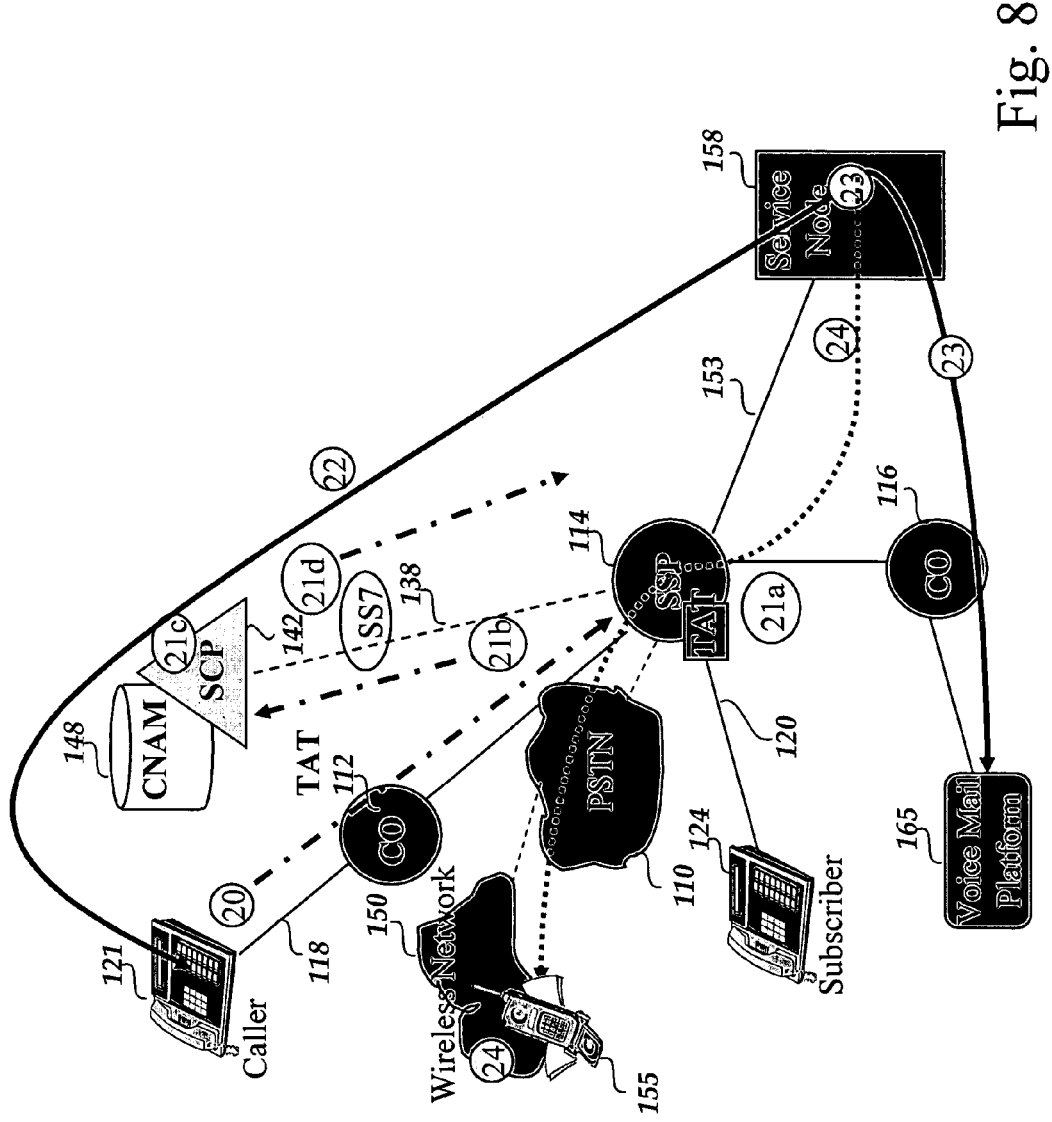
FIG. 8 illustrates a logical call flow of the steps performed by a method system of the present invention for monitoring a call directed to a network-based voice mail system where the calling party is not on a list of calling parties designated by the subscriber that should not be monitored.

FIG. 8 illustrates a logical call flow of the steps performed by a method system of the present invention for monitoring a call directed to a network-based voice mail system where the calling party is not on a list of calling parties designated by the subscriber that should never be monitored. At step 20, a caller utilizing her telephone 121 dials the telephone directory number of the subscriber at the subscriber's telephone 124. At step 21a, a determination is made at the subscriber's switch 114 as to whether the call is answered. If the call is answered, the method ends. If the call is not answered a determination is made as to whether a Call Forwarding No Answer feature is activated or whether a Call Forwarding On Busy feature is activated. If the call to the subscriber is forwarded because the line is not answered or because the line is busy, at step 21b, a PODP trigger is fired at the subscriber switch 114 causing a query to be launched to the service control point 142.

At step 21c, the service control point 142 checks the remote call monitoring status, remote call monitoring directory number and filter settings provided by the subscriber. According to the call flow illustrated in FIG. 8, the service control point 142 next determines that the remote call monitoring status for the subscriber's line 120 is set to ON. In contrast to the call flow illustrated at FIG. 7, the service control point 142 next determines that the directory number associated with the incoming call is not on the "never monitor" list. Accordingly, the service control point 142 routes the calling party number, the subscriber number, the voice mail system access number and the remote call monitoring directory number to the services node 158 for processing as is described for steps 4 through 6 of FIG. 4.

Figure 9:
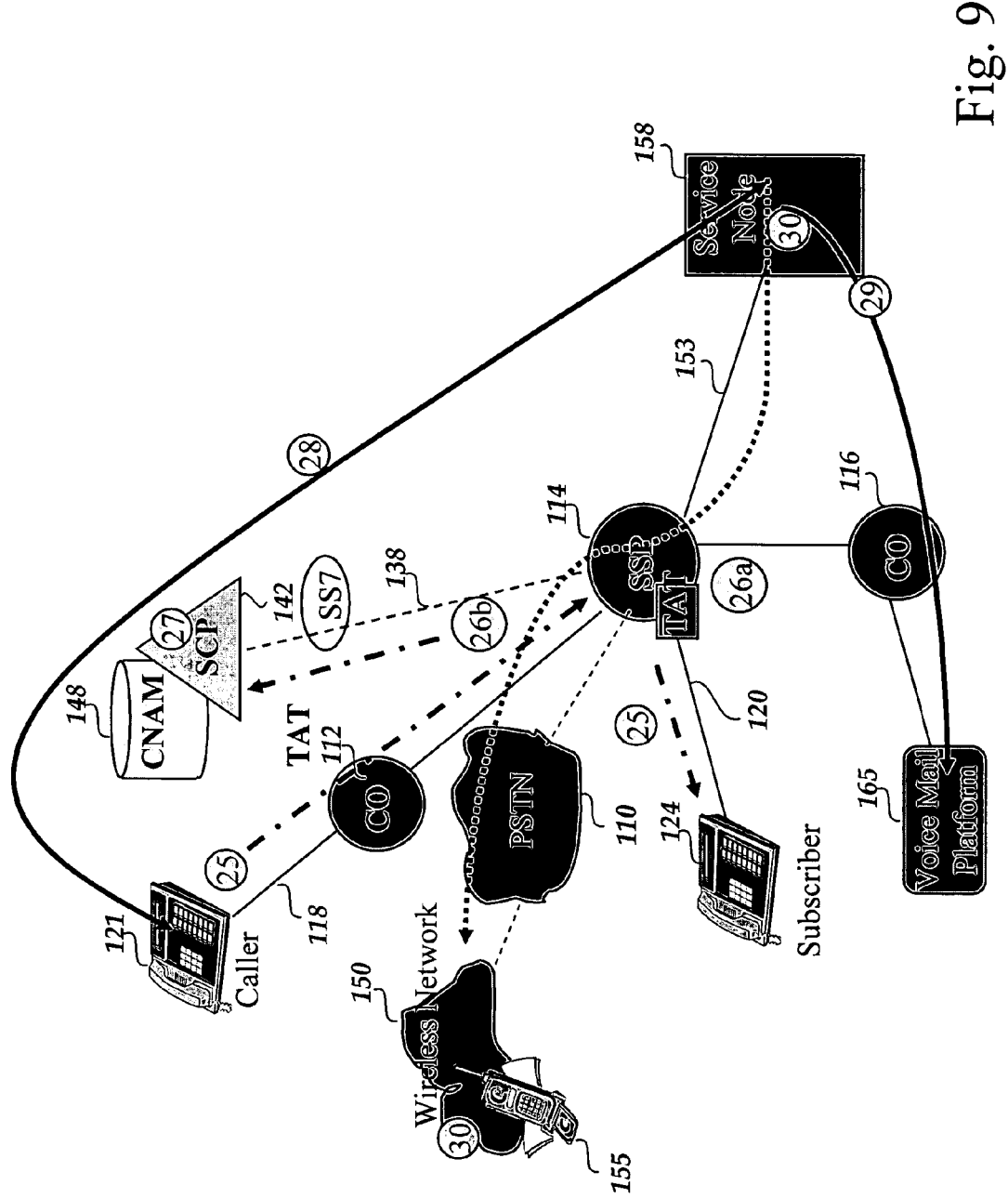
FIG. 9 illustrates a logical flow of the steps performed by a method system of the present invention for monitoring a call directed to a network-based voice mail system where the monitoring of calls directed to the voice mail system is dictated by a remote call monitoring schedule provided by the subscriber.

FIG. 9 illustrates a logical flow of the steps performed by a method system of the present invention for monitoring a call directed to a network-based voice mail system where the monitoring of calls directed to the voice mail system is dictated by a remote call monitoring schedule provided by the subscriber. At step 25, a caller utilizing her telephone 121 dials the telephone directory number of the subscriber at the subscriber's telephone 124. At step 26a, a determination is made at the subscriber's switch 114 as to whether the call is answered. If the call is answered, the method ends. If the call is not answered a determination is made as to whether a Call Forwarding No Answer feature is activated or whether a Call Forwarding On Busy feature is activated. If the call to the subscriber is forwarded because the line is not answered or because the line is busy, at step 26b, a PODP trigger is fired at the subscriber switch 114 causing a query to be launched to the service control point 142.

At step 27, the service control point 142 checks the remote call monitoring status of the subscriber's line 120, retrieves the remote call monitoring directory number and checks for filter settings provided by the subscriber. The service control point 142 determines whether the remote call monitoring status is set to ON and determines whether any filter setting provided by the subscriber requires that call be routed directly to the voice mail system 165. For example, the service control point checks to see that the directory number associated with the incoming call is not on the "never monitor" list. Next, the service control point 142 retrieves the remote call monitoring service schedule provided by the subscriber as described above with reference to FIGS. 2 and 3. If remote call monitoring is not allowed according to the remote call monitoring service schedule, the call is routed directly to the voice mail system 165. For example, if the subscriber provided a remote call monitoring service schedule requiring that remote call monitoring is only allowed between the hours of 8:00 a.m. and 10:00 a.m., the service control point 142 checks to determine whether the present incoming call is between the hours of 8:00 a.m. and 10:00 a.m. If not, the service control point 142 determines that the remote call monitoring is not allowed according to the remote call monitoring schedule, and the call is routed directly to the voice mail system 165.

If remote call monitoring is allowed according to the remote call monitoring schedule, at step 28, the service control point 142 retrieves the remote call monitoring directory number, the calling party directory number, the subscriber directory number and a voice mail access number for provision to the services node 158. At steps 29 and 30, the service control point 142 routes the information to the services node 158, and the services node 158 sets up the remote call monitoring session for the subscriber, as described above with reference to FIG. 4.

Figure 10:
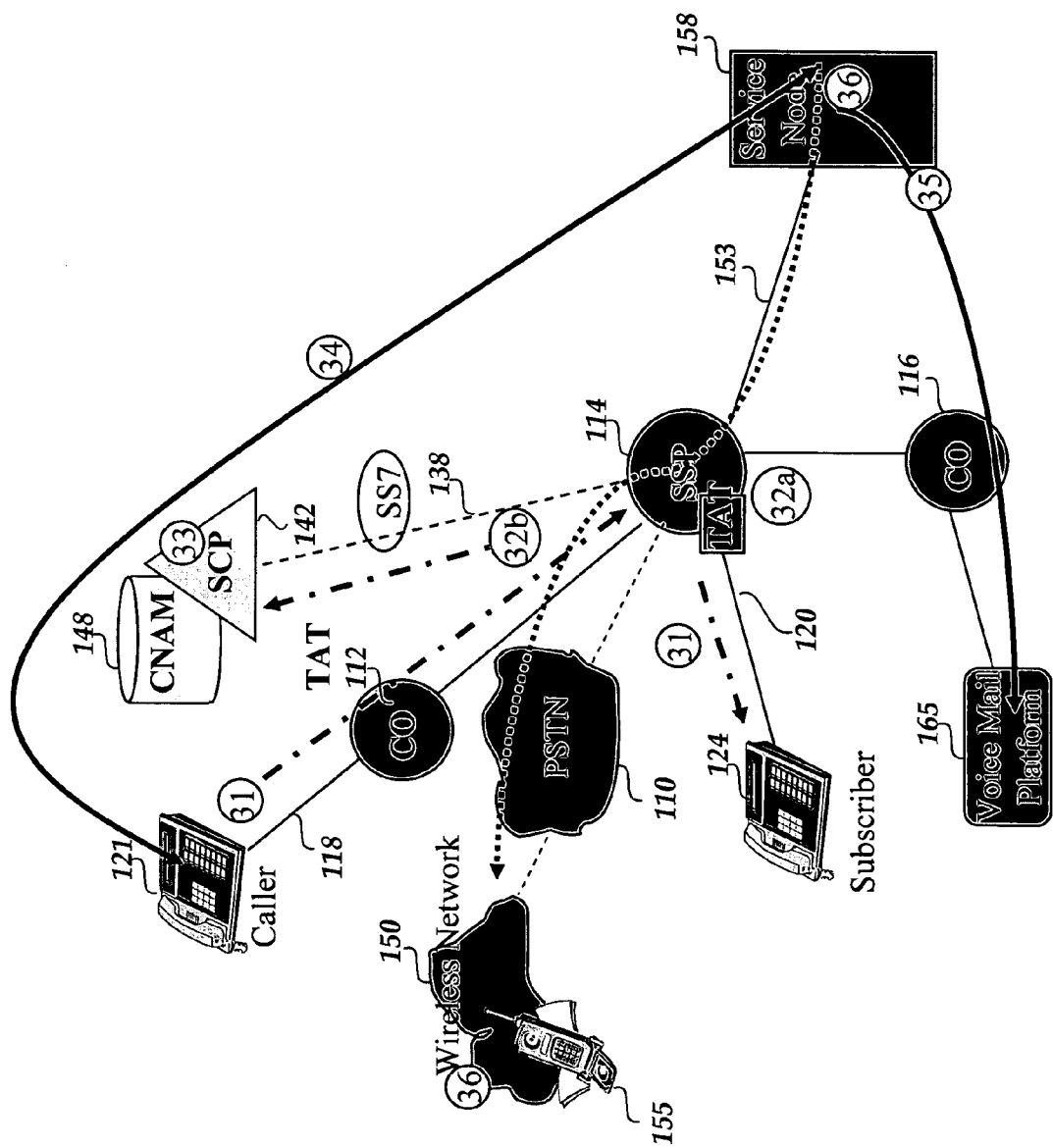
FIG. 10 illustrates a logical flow of the steps performed by a method system of the present invention for remotely monitoring a call directed to a network-based voice mail system filtered based on whether calls directed to the subscriber are forwarded on a "busy" status or whether calls directed to the subscriber are forwarded on a "not answered" status.

FIG. 10 illustrates a logical flow of the steps performed by a method system of the present invention for remotely monitoring a call directed to a network-based voice mail system filtered based on whether calls directed to the subscriber are forwarded on a "busy" status or whether calls directed to the subscriber are forwarded on a "no answered" status. At step 31, the calling party dials the subscriber from the caller telephone 121 to the subscriber telephone 124 via the subscriber's line 120. At step 32a, the Call Forwarding No Answer/Call Forwarding On Busy service is activated. The Call Forwarding No Answer has a forwarding number that is distinct from the forwarding number used for Call Forwarding On Busy. Both numbers cause a PODP trigger to be fired at the subscriber's switch 114. It should be understood by those skilled in the art that the Call Forwarding No Answer services activates if the subscriber's telephone does not answer after a prescribed number of rings. The Call Forwarding On Busy service activates anytime the subscriber's line is busy.

At step 32b, the PODP query is launched in response to PODP trigger, and at step 33, the query is received by the service control point 142. At step 33, the service control point 142 checks the remote call monitoring service status, the remote call monitoring directory number, and any remote call monitoring service filter settings provided by the subscriber. The service control point 142 determines whether the remote call monitoring service is set to ON and whether the caller is not on a "never monitor" list. If remote call monitoring is otherwise allowed for the present incoming call, service control point 142 compares the forwarding directory number to the remote call monitoring service assigned numbers for call forwarding no answer service versus call forwarding busy service to determine if the call was forwarded based on a "no answer" status or based on a "busy" status. As should be understood, if the PODP query has been forwarded to the service control point 142 in response to "busy" status and the remote call monitoring directory number provided by the subscriber is a number associated with the subscriber's telephone 124, then the service control point 142 routes the call directly to the voice mail system because the subscriber necessarily may not listen to the voice mail message being recorded by the incoming caller if the subscriber is engaged in the communication using the telephone 124 at the subscriber line 120.

At step 34, in either case of a "non answer" status or a "busy" status where the remote call monitoring directory number is other than the number associated with the busy subscriber line, the method proceeds to step 35, and the service control point 142 routes to the services node 158 the calling party directory number, the subscriber directory number, the voice mail access number and the remote call monitoring directory number. At step 36, the services node 158 sets up the three-way communication between the calling party, the voice mail system 165 and the subscriber's remote telephone, such as the wireless telephone 155, as described above with reference to FIG. 4.

The call flow types described above with reference to FIGS. 4 through 10 are described separately for purposes of ease of description only. According to a preferred embodiment, the service control point 142 checks the remote call monitoring status and filter settings provisioned on the subscriber's line 120 each time the PODP query corresponding to the remote call monitoring service is received. That is, each time an incoming call triggers the PODP query to initiate the remote call monitoring service, the service control point checks the remote call monitoring status and filter settings to determine how the remote call monitoring service should be applied to the incoming call. Each time an incoming call triggers the PODP query to the service control point 142 for provision of remote call monitoring services, a determination is first made as to whether the remote call monitoring status is set to ON. If the remote call monitoring status is set to OFF, the service call point 142 checks whether the directory number associated with the incoming caller is on a "always monitor" list such that the call will receive remote call monitoring service even if the remote call monitoring service is set to OFF.

If the remote call monitoring service is set to ON, the service control point determines whether the directory number of the incoming caller is included on a "never monitor" list. If so, the call is routed directly to voice mail services, as described above with reference to FIG. 7. If the remote call monitoring status is set to ON and the directory number for the incoming caller is not on the "never monitor" list, the service control point 142 next determines whether remote call monitoring is allowed relative to a remote call monitoring scheduling filter, as described above with reference to FIG. 9. If remote call monitoring is not allowed at the time of the incoming call, the call is routed directed to voice mail system 165. If remote call monitoring is allowed at the time of the incoming call according to the remote call monitoring schedule, then a determination is then made as to whether the remote call monitoring service has been invoked based on a "no answer" status or based on a "busy" status. As described above with reference to FIG. 10, if the remote call monitoring service has been invoked based on a "busy" status, a final determination is made as to whether the remote call monitoring directory number provided by the subscriber is the same directory of the subscriber's telephone 124. If so, the incoming call is routed directly to the voice mail system 165. If not, or if the remote call monitoring service was invoked based on a "no answer" status, then the remote call monitoring is activated so that the subscriber may listen to the voice mail message being recorded by the caller at the voice mail system 165.

Figure 11:
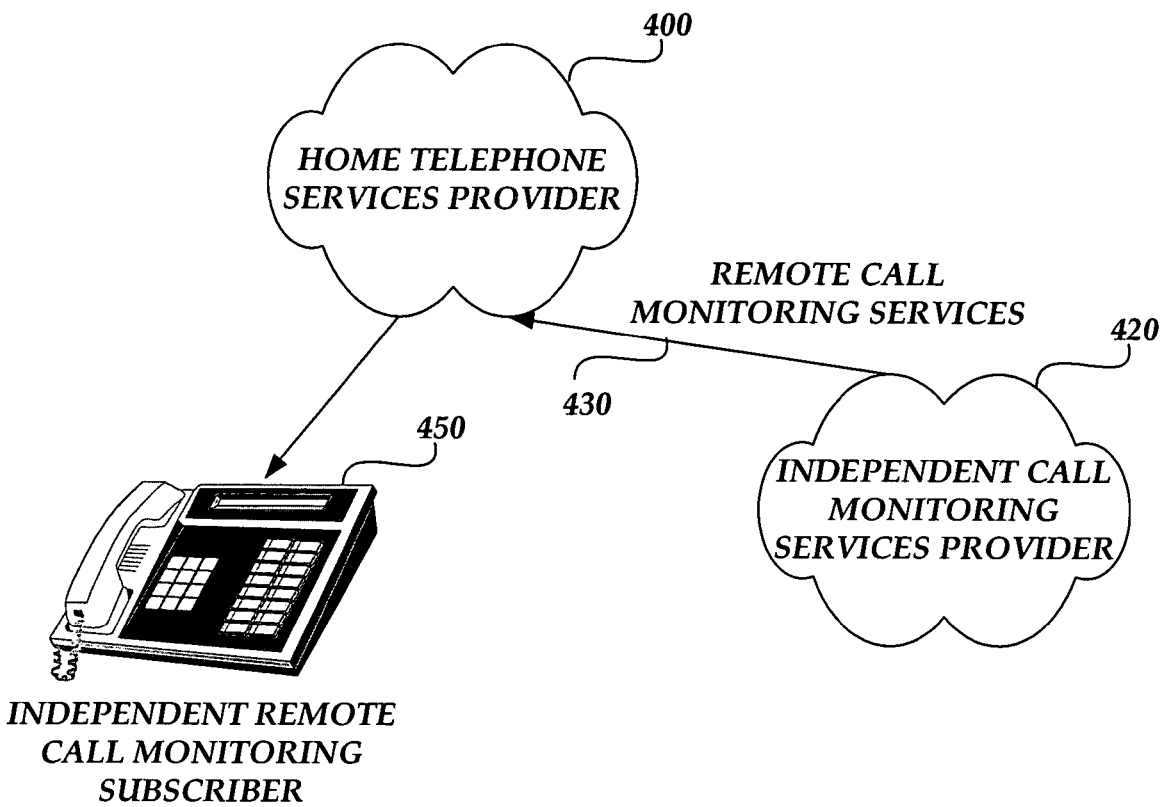
FIG. 11 is a simplified block diagram illustrating a relationship between a home telephone services provider and an independent call monitoring services provider for providing remote call monitoring services to a subscriber of the home telephone services provider.

Referring to FIG. 11, according to an alternative embodiment of the present invention, a subscriber 450 may obtain the remote call monitoring services from a telephone services provider that is independent from the subscriber's home telephone services provider. For example, the subscriber may obtain her wireline or wireless telephone services from a telephone services provider that does not offer the remote call monitoring services of the present invention. A separate or independent call monitoring services provider 420 may offer the remote call monitoring services of the present invention, and thus, according to this embodiment of the present invention, the subscriber as an independent remote call monitoring subscriber may obtain the remote call monitoring services of the independent call monitoring services provider.

Before the independent remote call monitoring subscriber 450 may obtain the remote call monitoring services of the independent call monitoring services provider 420, the subscriber must activate the service from the independent call monitoring services provider in association with the subscriber's home telephone services provider 400. The subscriber contacts the independent call monitoring services provider to order the independent remote call monitoring services. During the administrative set up, as described with reference to FIGS. 2 and 3, according to this embodiment of the present invention the subscriber provides the independent call monitoring services provider the remote call monitoring directory number from which the subscriber desires to monitor telephone calls directed to the subscriber's home voice mail system. Additionally, the subscriber selects from the remote call monitoring filters described above, and the subscriber prepares the "always monitor" list and the "never monitor" list if desired. Additionally, the subscriber may direct the independent call monitoring services provider to allow the subscriber to monitor calls directed to the subscriber's home voice mail system when the subscriber's line is busy or is not answered.

Once the subscriber has activated the remote call monitoring services 430 of the independent call monitoring services provider 420, a telephone directory number for Call Forwarding No Answer and a telephone directory number for Call Forwarding On Busy is provided to the subscriber to, in turn, provide to the subscriber's home telephone services provider. Alternatively, the independent call monitoring services provider may forward these directly to the home telephone services provider 400 as identified by the subscriber. Once the home telephone services provider receives these forwarding numbers, the Call Forwarding No Answer and/or Call Forwarding On Busy numbers associated with calls directed to the subscriber are changed to the forwarding numbers provided by the independent call monitoring services provider. Accordingly, when telephone calls are directed to the subscriber's wireless or wireline telephone where a no answer or busy status is indicated, those telephone calls will be routed to the independent call monitoring services provider for provision of remote call monitoring services to the subscriber.

Figure 12:
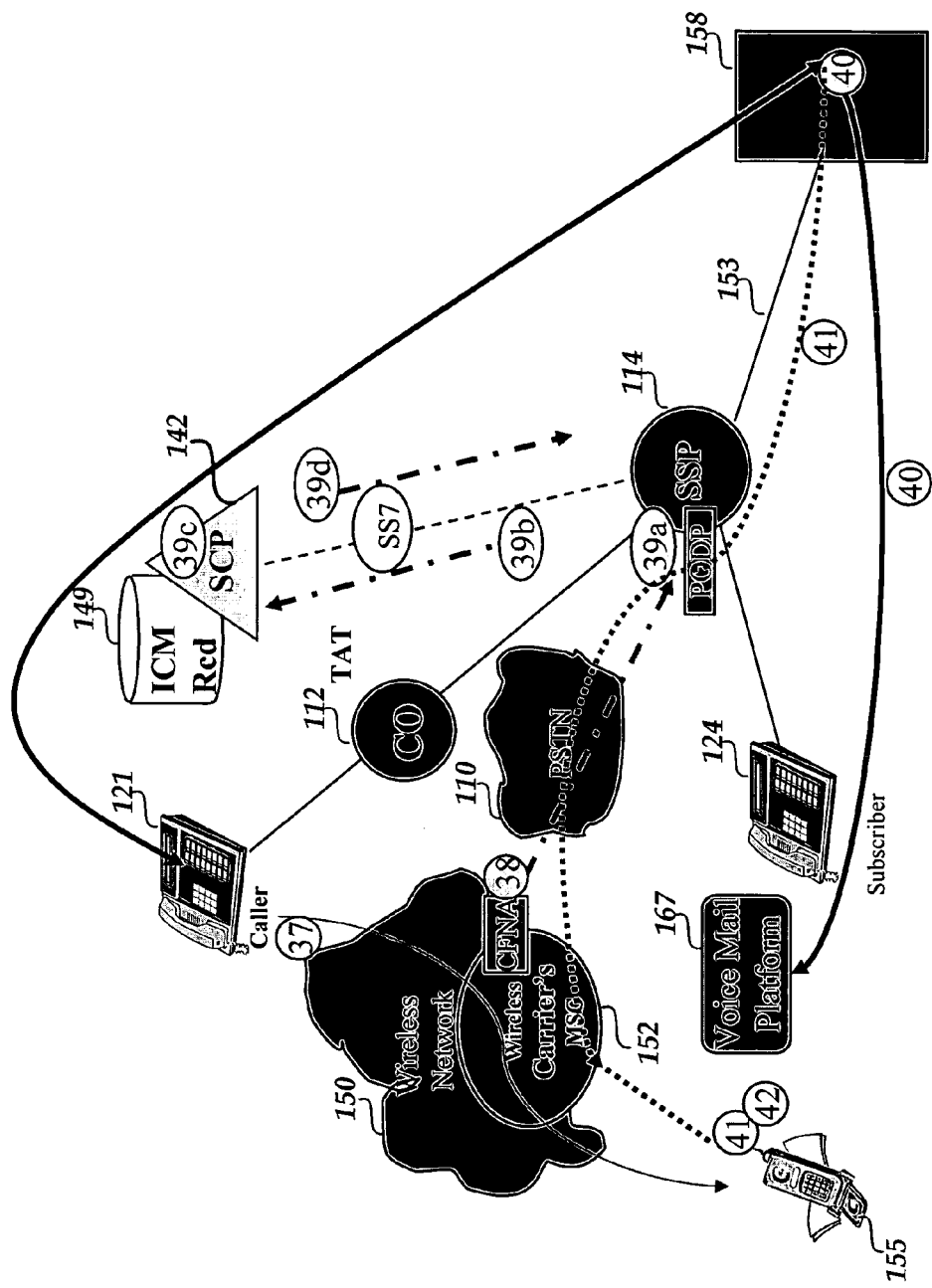
FIG. 12 illustrates a logical flow of the steps performed by a method and system of the present invention for remotely monitoring a call directed to a network-based voice mail system of a subscriber's home telephone services provider where the remote call monitoring service is provided by an independent call monitoring services provider, separate from the subscriber's home telephone services provider.

FIG. 12 illustrates a logical flow of the steps performed by a method and system of the present invention for remotely monitoring a call directed to a network-based voice mail system of a subscriber's home telephone services provider where the remote call monitoring service is provided by an independent call monitoring services provider, separate from the subscriber's home telephone services provider. For purposes of describing FIG. 12, assume, for example, that the subscriber operating a wireless telephone 155 operates the wireless telephone 155 via a home telephone services provider 400 and obtains independent remote call monitoring services from an independent call monitoring services provider 420, as illustrated in FIG. 11. For purposes of this description, the wireless network 150, the MSC 152, the voice mail platform 167, and the telephone 155 operate under the home telephone services provider 400. The ICM record database 149, the SCP 142, the switches 112, 114, and the services node 158 are operated by the independent call monitoring services provider 420. Additionally, as should be understood by those skilled in the art, description of this embodiment of the present invention with respect to a wireless telephone 155 is by way of example only. The independent remote call monitoring services of the present invention are likewise available and useful with respect to wireline telephones, such as the wireline telephones 121 and 124 described with reference to FIG. 1. That is, the subscriber may be called at any telephone directory number (remote call monitoring directory number) of any wireless or wireline telephone with which she may be connected to the three-way conference call for monitoring a message being left at her voice mail system.

At step 37, a caller using her telephone 121 dials the telephone directory number of the subscriber at the subscriber's wireless telephone 155. At step 38 according to the present example, the subscriber does not answer the wireless telephone 155, and accordingly, the Call Forwarding No Answer (CFNA) status is activated at the subscriber's MSC switch 152. As described above, as part of the activation of the independent remote call monitoring services, the Call Forwarding No Answer and/or Call Forwarding On Busy (CFB) numbers associated with the subscriber's telephone directory number are changed to numbers provided by the independent call monitoring services provider so that calls activating the CFNA or CFB status are forwarded to the independent call monitoring services provider for providing remote call monitoring services to the subscriber 450.

At step 39*a*, once the CFNA status is incurred at the subscriber's MSC 152, the directory number provided by the independent call monitoring services provider causes the telephone call to be forwarded to the independent call monitoring services provider at a switch of the independent telephone services provider such as the switch 114. At step 39*b*, the switch 114 launches a PODP query to the service control point 142. At step 39*c*, the service control point 142 parses the PODP query from the switch 114 and determines that the query is associated with independent remote call monitoring services of the subscriber.

The service control point 142 queries the independent call monitoring records database 149 for information associated with the subscriber for providing remote call monitoring services to the subscriber. The service control point 142 retrieves from the records database 149 the voice mail system access number for the subscriber's home voice mail platform 167 to which the incoming call will be directed if the subscriber does not answer the incoming telephone call. At step 39*d*, the service control point 142 routes to the services node 158 of the independent call monitoring services provider the calling party directory number, the subscriber's directory number, and the voice mail system access number for the home voice mail platform 167.

At step 40, the services node 158 sets up a call between the incoming caller from the caller's telephone 121 and the home voice mail platform 165 of the subscriber's home telephone services provider through the MSC switch 152. At step 41, once the incoming caller is connected to the voice mail platform 167, the services node 158 sets up a three-way conference call between the incoming caller, the home voice mail platform 167 and the subscriber by placing a call to the subscriber at the remote call monitoring telephone directory number provided by the subscriber and by connecting the subscriber to the communication between the incoming caller and the home voice mail platform 167. As described above, the subscriber is connected to the call between the incoming caller and the voice mail platform 167 in a "listen only" mode so that the subscriber may listen to the message being left at her home voice mail platform 167 by the incoming caller. Additionally, as described above with reference to FIG. 4, the subscriber may interrupt the message being left by the incoming caller to the subscriber's home voice mail system 167, and the services node 158 will route the call to the subscriber at the remote call monitoring directory number, and the connection between the caller, the services node 158 and the voice mail system 167 is terminated so that the incoming caller is left in direct communication with the subscriber at the subscriber's remote call monitoring directory number.

As described above with respect to other embodiments of the present invention, a caller identification name such as "call monitoring" may be provided to the subscriber to alert the subscriber that the call is associated with remote call monitoring services. Likewise, the subscriber may be provided with a distinctive ring to alert the subscriber that the incoming call is a call associated with remote call monitoring services. Additionally, as should be understood, the remote call monitoring filters including utilization of "always monitor" and "never monitor" lists are available to the subscriber via the services of the independent call monitoring services provider 420, as described above with referenced FIGS. 4 through 10.

As described, methods and systems are provided for monitoring calls routed to a voice mail system from a variety of remote telephone locations. It will be apparent to those skilled in the art that various modifications and variations may be made in the present invention without departing from the scope or spirit of the invention. Other embodiments of the invention will be apparent to those skilled in the art from consideration of the specification and practice of the invention described herein.

I claim:

1. A method of monitoring calls, the method comprising:
   comparing, at a first network element, a called number of a received call to a directory number stored in a list of directory numbers to determine whether a remote call monitoring service should be applied to the received call;
   forwarding the received call to a second network element when the remote call monitoring service is to be applied to the received call; and
   forwarding the received call to the voice mail system when the remote call monitoring service should not be applied to the received call;
   wherein forwarding the received call to the second network element comprises:
   determining whether a calling party's identification for the calling party is on an always monitor list provided by the subscriber, forwarding the received call to the voice mail system when the calling party's identification is not on the always monitor list, and causing the second network element to set up a three-way communication between the calling party, the voice mail system, and the subscriber so that the subscriber may monitor the received call when the calling party's identification is on the always monitor list;
   wherein the always monitor list includes a list of calling party identifications associated with a plurality of calling parties, and wherein the received call is forwarded to the remote call monitoring service when it is from any of the calling party identifications listed in the always monitor list.

2. The method of claim 1, wherein causing the second network element to set up the three-way communication comprises causing the second network element to set up the three-way communication via a remote call monitoring directory number provided by the subscriber.

3. The method of claim 1, wherein the calling party identifications includes a caller ID presentation indicator status of one of the following: private, unknown, and out-of-area.

4. The method of claim 1, further comprising prior to receiving the received call, provisioning the remote call monitoring service on a subscriber line.

5. The method of claim 1, further comprising: interrupting the three-way communication between the calling party, the voice mail system, and the subscriber; and connecting the calling party and the subscriber to allow a two-way communication between the calling party and the subscriber.

6. The method of claim 1, further comprising: determining if the calling party's identification for the calling party is on a never monitor list; and forwarding the received call to the voice mail system when the calling party is on the never monitor list.

7. The method of claim 1, further comprising: setting up a remote call monitoring schedule outlining a time period when call monitoring should be provided; and monitoring the received call only when the received call is received in the time period.

* * * * *